United States Patent [19]
Emura et al.

[11] 3,866,053
[45] Feb. 11, 1975

[54] APPARATUS FOR DETECTING THE CONDITION OF AN OPAQUE BAND-SHAPED MATERIAL TRAVELLING ON A DELIVERY SYSTEM

[75] Inventors: Tokumatsu Emura, Yokohama; Shigeo Kawabata, Tokyo; Takashi Shimoma, Yokohama, all of Japan

[73] Assignee: Nippon Kokan Kabushiki Kaisha, Tokyo, Japan

[22] Filed: May 30, 1974

[21] Appl. No.: 474,593

Related U.S. Application Data

[62] Division of Ser. No. 348,111, April 5, 1973, Pat. No. 3,833,816.

[52] U.S. Cl. ................ 250/561, 250/548, 250/571
[51] Int. Cl. .................... G01n 21/30, G06k 11/02
[58] Field of Search ............ 250/548, 561, 571, 560

[56] References Cited
UNITED STATES PATENTS
2,643,117   6/1953   Frisbie et al. ...................... 250/548

FOREIGN PATENTS OR APPLICATIONS
144,035   4/1961   U.S.S.R. .............................. 250/560

*Primary Examiner*—Eli Lieberman
*Assistant Examiner*—T. N. Grigsby
*Attorney, Agent, or Firm*—Flynn & Frishauf

[57] ABSTRACT

An apparatus for detecting the parallelism between the lengthwise edge of an opaque band-shaped material travelling on a delivery system relative to the longitudinal axis of the delivery system wherein a first and a second detector are spatially arranged along the lengthwise edge, in the direction of travel of the lengthwise edge on the delivery system, so as to detect the position of the lengthwise edge, each detector including light projector and a light receiver facing said projector across the lengthwise edge of the travelling material. Each light receiver preferably includes an aggregate of numerous fine optical fibers and numerous photoelectric conversion elements connected to the individual fibers. Outputs from the first and second detectors are conducted from the numerous photoelectric conversion elements supplied with light from the light projectors to two input terminals of a differential amplifier which in turn generates outputs for detecting the parallelism of the edge of the band-shaped material travelling on the delivery system.

1 Claim, 22 Drawing Figures

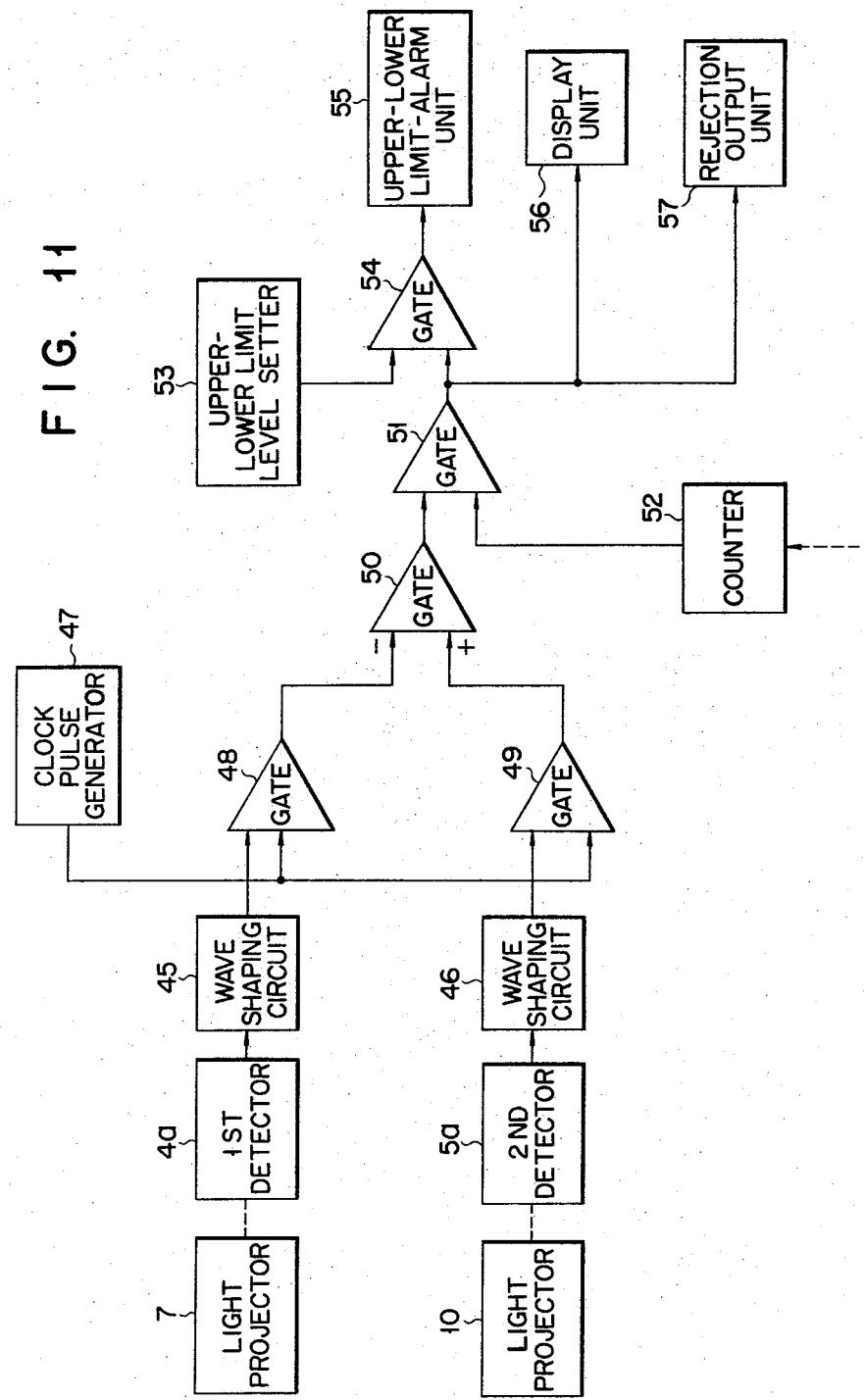

APPARATUS FOR DETECTING THE CONDITION OF AN OPAQUE BAND-SHAPED MATERIAL TRAVELLING ON A DELIVERY SYSTEM

CROSS-REFERENCE TO RELATED APPLICATION

This is a division of Ser. No. 348,111 filed Apr. 5, 1973, now U.S. Pat. No. 3,833,816, issued Sept. 3, 1974.

BACKGROUND OF THE INVENTION

This invention relates to an apparatus for detecting the parallelism of the edge of a continuous opaque band-shaped material such as a rolled steel strip or a sheet of paper travelling on a delivery system relative to the longitudinal axis of the delivery system.

Where a steel strip rolled by a roll assembly is conducted to a shearing machine through a delivery system so as to be cut into the prescribed size, it is desired that the cutter blade of the shearing machine be previously positioned perpendicular to the central axis of the delivery system. If, in this case, the central axis of a travelling rolled steel strip and that of the delivery system are parallel with each other, then the cut sides of the steel strip will be at right angles to the lengthwise edge thereof. Conversely, where the central axis of the travelling steel strip and that of the delivery system are rendered nonparallel with each other, it will be impossible to obtain a steel strip of exact rectangularity. Hitherto, where determination is to be made of the rectangularity of cut pieces of a rolled steel strip, some samples of said pieces are taken at random off the delivery system and said determination has been carried out for each sample, using, for example, a dial gauge. This procedure not only consumes a great deal of time and presents difficulties in total measurement, but also results in the decreased operating efficiency due to the sampling of cut pieces of rolled steel while shearing is continued. Further, said procedure fails to attain accurate determination, so that where a rigid tolerance is demanded for the rectangularity of cut pieces of rolled steel, the procedure is found substantially incapable of meeting such demand.

This invention has been accomplished in view of the above-mentioned circumstances and is intended to provide an apparatus for detecting the condition of an opaque band-shaped material travelling on a delivery system which measures the parallelism between the central axis or lengthwise edge of an elongate opaque band-shaped material such as a rolled steel strip or a sheet of paper travelling on a delivery system and the central axis of said system so as to detect the travelling condition of said material, thereby determining on line the rectangularity of the cut sides of, for example, the rolled steel strip to its lengthwise edges.

SUMMARY OF THE INVENTION

According to an aspect of this invention, there is provided an apparatus for detecting the parallelism between the lengthwise edge of an opaque band-shaped material travelling on a delivery system relative to the longitudinal axis of the delivery system, comprising a first and a second detector spatially arranged along the lengthwise edge in the direction of travel of the lengthwise edge on the delivery system so as to detect the position of said lengthwise edge, each detector including a light projector and a light receiver facing said projector across the lengthwise edge of the travelling material; and means for generating a signal indicating the parallelism of the lengthwise edge of the band-shaped material travelling on the delivery system upon receipt of outputs from said first and second detectors.

BRIEF DESCRIPTION OF THE DRAWINGS

FIG. 11 is a block circuit diagram of a detecting apparatus using the detector of FIG. 10;

FIGS. 12A–12C and 13A–13C show the wave forms of output signals from the first and second detectors of FIG. 11, respectively; and FIGS. 14A–14E indicate the wave forms of signals by way of illustrating the operation of the embodiment of FIG. 11.

DETAILED DESCRIPTION OF THE INVENTION

There will now be described the preferred embodiments of this invention where there is used the apparatus of the invention for detecting the condition of a rolled steel strip travelling on a delivery system, thereby determining the rectangularity of the cut sides of the strip to its lengthwise edges, as obtained during the shearing operation. It will be noted, however, that the invention is not limited to this application, but may also be used in detecting the condition of a sheet of paper travelling on a delivery system installed in, for example, a paper mill, thereby attaining the accurate rectangularity of the cut sides of the sheet of paper to its lengthwise edges.

Figure 1:
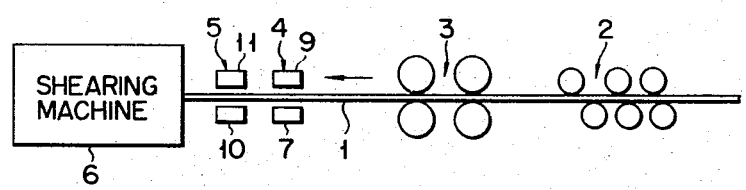
FIG. 1 is a schematic diagram showing the arrangement of the delivery system of this invention for conducting a rolled steel strip.

Referring to FIG. 1, a rolled steel strip 1 is made to travel in the direction of the indicated arrow by a pinch roll assembly 3 through a level roll assembly 2 to a shearing machine 6 after passing a first and a second detector 4 and 5. Though, according to FIG. 1, the level roll assembly 2 and pinch roll assembly 3 collectively form a delivery system for a steel strip 1, it is possible to construct said delivery system by additionally providing a side guide roll assembly (not shown) to control the crosswise shifting of the travelling steel strip.

Figure 2:
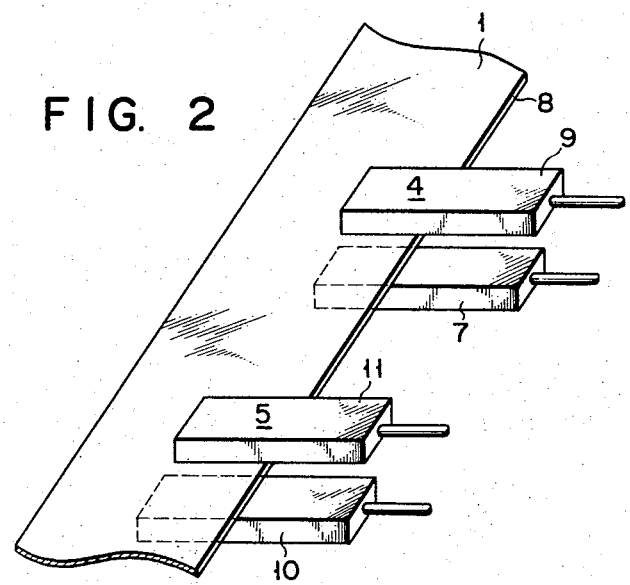
FIG. 2 is a perspective view of a first and a second detector according to an embodiment of the invention spatially arranged along one of the lengthwise edges of the travelling rolled steel strip.
Figure 3:
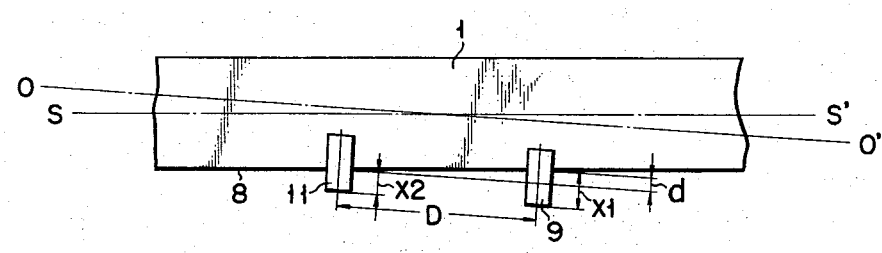
FIG. 3 illustrates the relative position of the edge of a rolled steel strip to the first and second detectors when the central axis of said strip is displaced from that of the delivery system.
Figure 4:
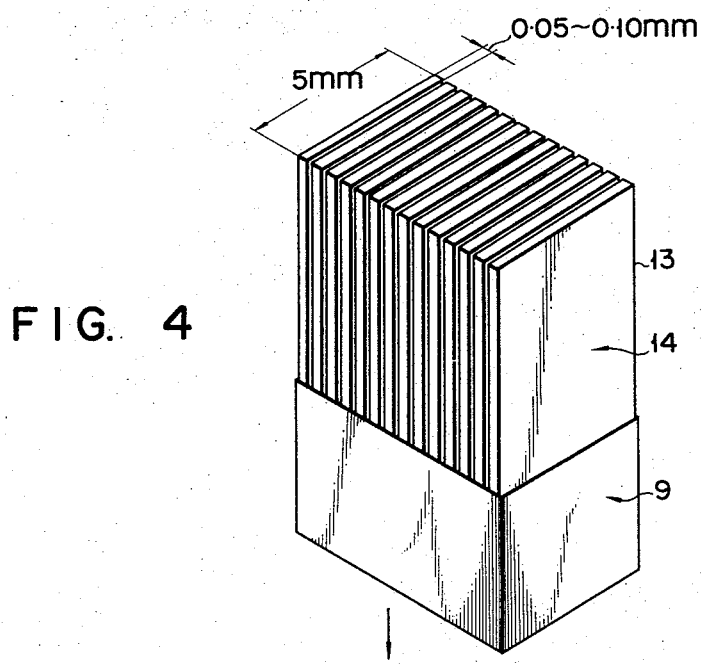
FIG. 4 is a perspective view of a light receiver included in the detectors of FIGS. 2 and 3, showing the detailed construction of said receiver.
Figure 5:
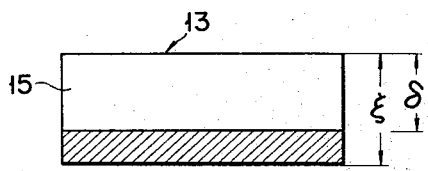
FIG. 5 shows an optical fiber of FIG. 4 where light is projected on the light receiving surface of said fiber.

As seen from FIG. 2, the first detector 4 comprises a light projector 7 and a light receiver 9 facing said projector 7 across one of the lengthwise edges 8 of a rolled steel strip 1. Part of the light from the light projector 7 is shut off or blocked by said lengthwise edge 8 of the steel strip 1, the remainder directly reaching the light receiver 9. The second detector 5 is placed on the lengthwise edge 8 near the entrance to a shearing machine 6, at a point spaced a prescribed distance of, for example, 550 mm from said first detector 4. Like the first detector 4, the second detector 5 comprises a light projector 10 and a light receiver 11. Both first and second detectors 4 and 5 are arranged, as shown in FIG. 3, at a prescribed interval D in parallel with the central axis O—O of the delivery system, Where, therefore, the lengthwise edge 8 or the central axis S—S of the rolled steel strip 1 is parallel with the central axis O—O of the delivery system, then the cut sides of said steel strip 1 will be kept at right angles to its lengthwise edge 8. However, if the lengthwise edge 8 or central axis S—S of the steel strip 1 is inclined, as shown in FIG. 3, from the central axis O—O of the delivery system, then the above-mentioned rectangularity will be inaccurate. Now let it be assumed that the distance from the outer end of the light receiver 9 of the first detector 4 to that edge 8 of the steel strip 1 which faces said light receiver 9 is X1 and that the distance from the outer end of the light receiver 11 of the second detector 5 to that edge 8 of the steel strip 1 which faces said light receiver 11 is X2. Then the difference between both distances will be $X1 - X2 = d$. If, therefore, the interval D between both detectors 4 and 5 is previously fixed, then the magnitude of said difference d will immediately indicate the degree in which the central axis S—S or lengthwise edge 8 of the steel strip 1 is displaced from the central axis O—O of the delivery system. The first embodiment of this invention electrically determines the difference d on line. The light receiver 9 of the first detector 4 contains, as illustrated in FIG. 4, a bundle 14 of numerous optical fibers 13. Each of the optical fibers 13 is a fine element shaped into a thin elongate element with the longer side of the cross section measured to be, for example, 5 mm and the shorter side of the cross section to be 0.05 to 0.10 mm. These thin elements 13 are laminated into the aforesaid fiber bundle 14. The top side of the fiber bundle 14 constitutes the light receiving surface of the light receiver 9, and the bottom side is optically connected to a plurality of photoelectric conversion elements provided so as to face the respective optical fibers 13. Now let it be assumed that the region of the fine fiber element 13 other than the hatching of FIG. 5 is supplied with light and the shorter side of the light receiving surface 15 of said element 13 has a length of $\epsilon$ and the shorter side of that region of said light receiving surface 15 which is actually exposed to light has a length of $\delta$. Then from the ratio $\delta/\epsilon = \alpha$ which the length of the shorter side of the region actually exposed to light bears to the length of the shorter side of the entire light receiving surface 15, and from the condition that the intensity of light projected from the light projector 7 is constant, outputs from the photo-electric conversion element have been experimentally found to have such a relationship as expressed by the curve of FIG. 6 with respect to the valve A of said ratio.

To attain accurate determination in the first embodiment, it is necessary to quantize the output from the photoelectric conversion element which corresponds to the area of that region of the light receiving surface 15 of said element 13 which is actually exposed to light. To this end, it is advised to designate an output of, for example, more than 50% as 1 and an output of, for example, less than 50% as 0 and, in this case, to provide the output side of the photoelectric conversion element with such a switching element as is rendered conducting when an output from said photoelectric conversion element amounts to more than 50%.

Figure 7:
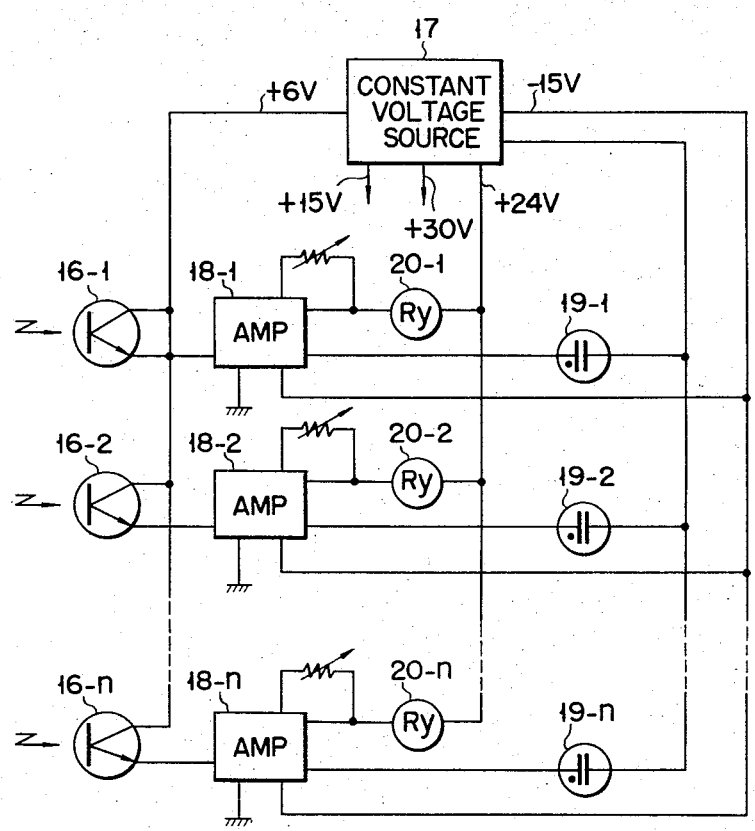
FIG. 7 indicates the concrete arrangement of a photoelectric conversion circuit included in the detectors according to the embodiment of FIG. 2.
Figure 8:
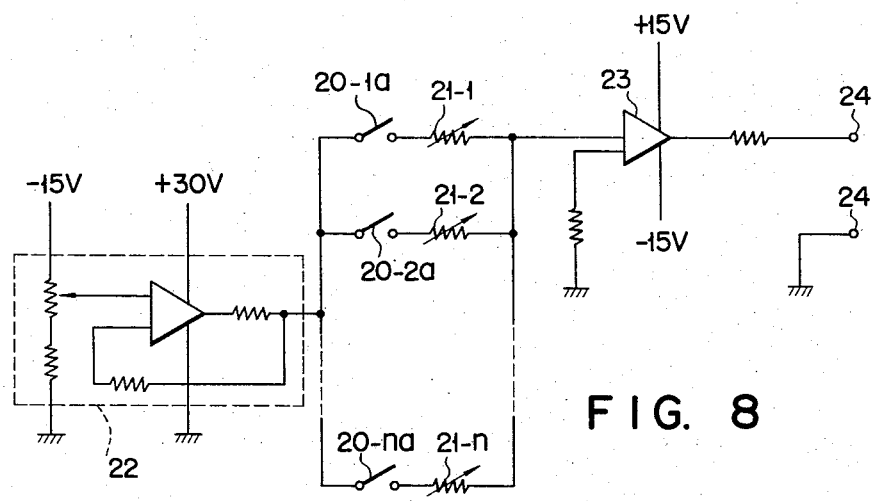
FIG. 8 shows the concrete arrangement of a switching circuit used in combination with the photoelectric conversion circuit of FIG. 7.

FIGS. 7 and 8 jointly illustrate a photoelectric conversion circuit containing the above-mentioned switching element. This circuit comprises a plurality of photoelectric conversion elements or phototransistors 16-$l$ to 16-$n$ optically connected to the corresponding optical fiber elements 13. The collectors of said phototransistors 16-$l$ to 16-$n$ are collectively connected to the output terminal (for example, +6 volts) of a constant voltage source 17. Photoelectric conversion outputs from the emitters of said phototransistors 16-$l$ to 16-$n$ are conducted to the corresponding amplifiers 18-$l$ to 18-$n$ for amplification. Outputs thus amplified cause the corresponding indication lamps 19-$l$ to 19-$n$ to give forth light, and at the same time actuate the corresponding relays 20-$l$ to 20-$n$.

Figure 6:
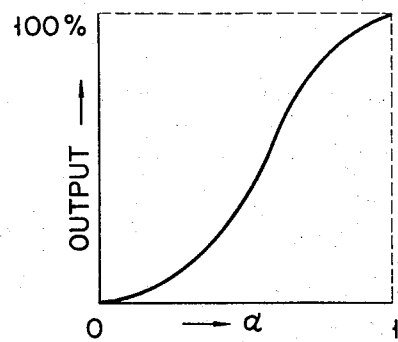
FIG. 6 is a curve diagram showing the property of a photoelectric conversion element to convert light to electric signals.

These relays 20-$l$ to 20-$n$ are so designed as to commence operation when outputs from the photoelectric conversion elements 16-$l$ to 16-$n$ account for more than 50% of the curve of FIG. 6. Since the photoelectric conversion elements 16-$l$ to 16-$n$ present somewhat varying properties, the amplifiers 18-$l$ to 18-$n$ are so designed as to have the degree of amplification adjusted so as to enable the relays 20-$l$ to 20-$n$ to be operated at such points as well match the varying properties of the photoelectric conversion elements 16-$l$ to 16-$n$.

The contacts 20-$la$ to 20-$na$ of the relays 20-$l$ to 20-$n$ are connected, as shown in FIG. 8, in series to variable resistors 21-$l$ to 21-$n$. Two circuits consisting of serially connected contacts 20-$la$ to 20-$na$ and serially connected variable resistors 21-$l$ to 21-$n$ respectively are connected in parallel with each other. Said parallel connected circuits are supplied with outputs from a voltage setting circuit 22 operated with output voltage from the constant voltage source 17 of FIG. 7. Outputs from said parallel connected circuits are conducted through an amplifier 23 to the output terminal 24 of the switching circuit of FIG. 8. Said output terminal produces such a magnitude of voltage as corresponds to the total amount of light supplied to the optical fibers 13 of the light receiver 9. Another detector 5 similarly consists of the light receiver 11, photoelectric conversion circuit and switching unit.

Figure 9:
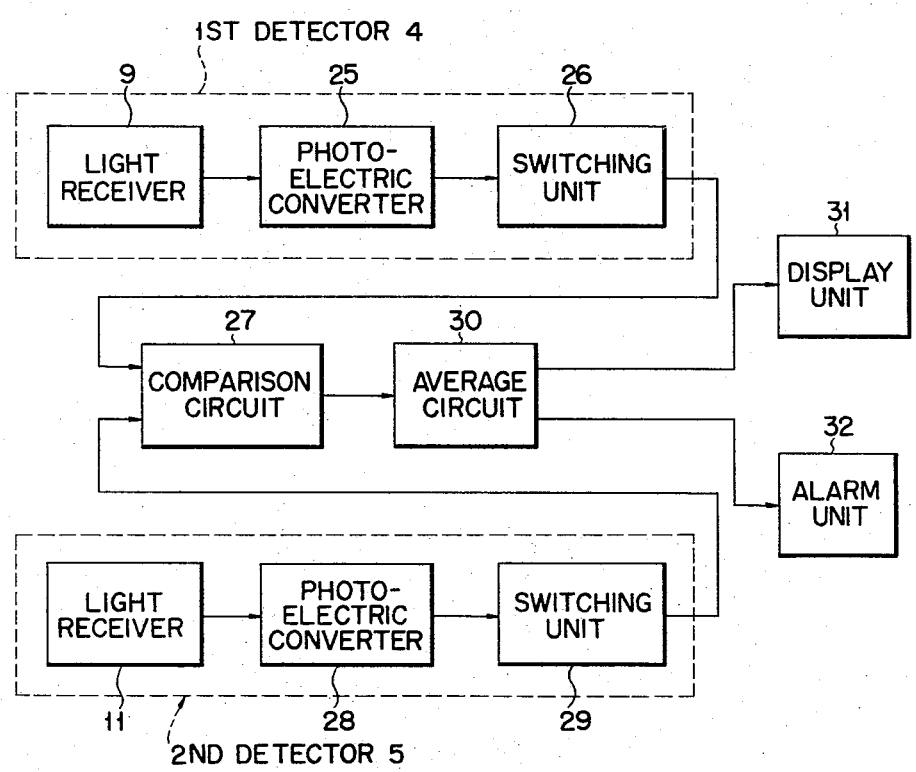
FIG. 9 is a block circuit diagram of a detecting apparatus according to the embodiment of FIG. 2.

Received light beams from the light receiver 9 of the first detector 4 are converted, as shown in FIG. 9, to electric signals by a first photoelectric converter 25 including the photoelectric conversion elements 16-$l$ to 16-$n$ of FIG. 7, and then supplied to one input terminal of a comparison circuit 27 through a first switching unit 26 including relays 20-$l$ to 20-$n$ shown in FIG. 7. Similarly, received light beams from the light receiver 11 of the second detector 5 are converted to electric signals by a second photoelectric converter 28 including the photoelectric conversion elements 16-$l$ to 16-$n$ of FIG. 7, and then conducted to the other input terminal of the comparison circuit 27. This comparison circuit 27 consists of, for example, a differential amplifier and is so designed as to produce an output corresponding to a difference between the voltages of the above-mentioned two inputs of comparison circuit 27. Namely, an output from said comparison circuit 27 represents a difference d between the lengths X1 and X2 of those parts of the first and second light receivers 9 and 11 which are supplied with light (as defined in connection with FIG. 3). An output from the comparison circuit 27 is transmitted to an average circuit 30. Since a steel strip 1 passes the first and second detectors 4 and 5 at a relatively high speed, outputs from said detectors 4 and 5 vary one moment after another due to the fine roughness of the edge portion of the rolled steel strip 1. Sampling of such momentarily changing outputs is not of practical advantage due to the difficulty of effecting accurate determination. According to this embodiment, therefore, the values of outputs from the detectors 4 and 5 are averaged per prescribed length of time by the average circuit 30. This average circuit 30 is, for example, a timer circuit which consists of an integration capacitor actuated for a prescribed length of time T to integrate outputs from the comparison circuit 27 and a division circuit for dividing outputs from said integration capacitor by said prescribed length of time T. The division circuit produces an average of the values of outputs from the comparison circuit 27.

An output from the average circuit 30 is normally supplied to a display unit 31 and, if necessary, to an alarm unit 32. Thus, indication is made in an amount corresponding to the magnitude of the difference d of FIG. 3, and where said difference $d$ exceeds a prescribed value, an alarm is given by said alarm unit 32.

If, during the shearing of a steel strip 1 travelling on a delivery system, an operator adjusts the position of the strip 1 so as to make the central axis S—S of the strip 1 parallel with that O—O of the delivery system, namely, to reduce the aforesaid difference to zero, while looking at readings on the display unit 31, then there will be obtained a steel strip 1 whose cut sides are made perpendicular to the lengthwise edge.

In the foregoing embodiment, the light receiver includes optical fibers, so that the minute determining capacity of the detector of this invention depends on the side of the entire light receiving surface of each of said optical fibers. If said light receiving surface has an area of, for example, 5 mm × 0.05 to 0.10 mm as shown in FIG. 4, then the extent of displacement of a travelling steel strip determinable by said detector will be 50 to 100 microns. Though it may be desired to elevate the minute determining capacity of the detector of said embodiment using optical fibers by minimizing their size, yet it is extremely difficult to reduce the shorter side of the optical fiber to, for example, 10 microns, failing to put said detector to practical application in high precision determination.

Figure 10:
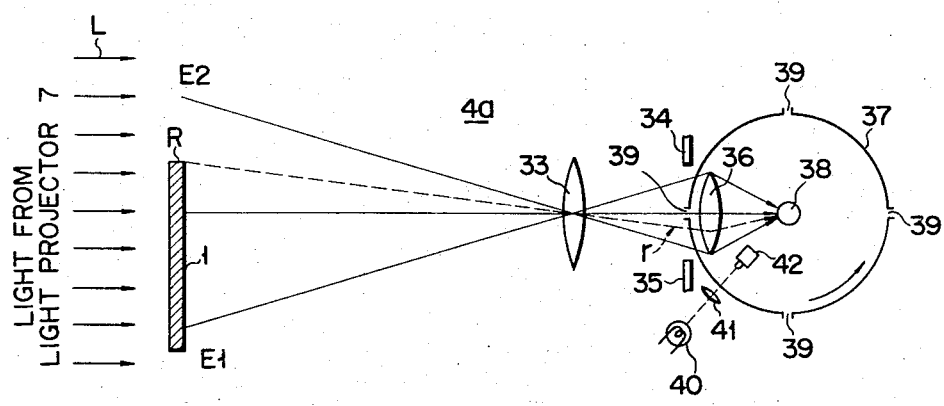
FIG. 10 illustrates the principle on which a detector according to another embodiment of the invention is based.

FIG. 10 illustrates a detector 4$a$ according to another embodiment of this invention which is improved in the above-mentioned respect. FIG. 10 only shows said detector 4$a$, because the other detector 5$a$ is of the same arrangement. There will now be described the arrangement and operation of said detector 4$a$. Parallel light L transmitted from the light projector 7 of FIG. 2 is focused by an object lens 33 and enters the opening 35 of a view mask 34. On the inside of a scanning drum 37 facing the opening 35 of the view mask 34 is disposed a focusing lens 36. A beam of light focused by the focusing lens 36 is projected on the light receiving surface of a photoelectric conversion element 38. The scanning drum 37 has a plurality of, for example, four scanning slits 39, which enable scanning to be effected on the opening 35 of the view mask 37 from the top to the bottom with the rotation of the scanning drum 37 in the direction of the indicated arrow. Near a point on the outer periphery of the scanning drum 37 are provided a lamp 40 and focusing lens 41 so as to face a photoelectric conversion element 42 across the wall of said drum 37. All the above-mentioned members 40 to 42 constitute a synchronizing signal generator.

Figure 12A:
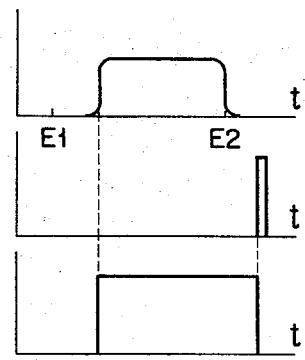

When one lengthwise edge 8 of the steel strip 1 is positioned at R in a scanning range of E1-E2, an image of R is focused at $r$ within the opening 35 of the view mask 34. When one of the slits 39 of the scanning drum 37 passes $r$ as the result of its rotation in the direction of the indicated arrow, then parallel light L from the light projector 7 is received by the photoelectric conversion element 38, an output pulse from which rises at E1 and falls at E2 as illustrated in FIG. 12A. When the scanning drum 37 further rotates, the scanning slit 39 passes the photoelectric conversion element 42, producing a synchronizing pulse in a timing shown in FIG. 12B.

Figure 13A:
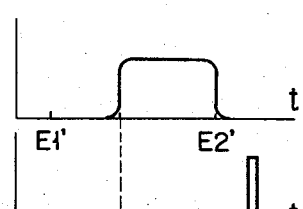

Referring now to FIG. 11, light from the first light projector 7 is conducted, as in FIG. 10, to a first detector 4a and outputs from the photoelectric conversion elements 38 and 42 of FIG. 10 are transmitted to a first wave shaping circuit 45, where said outputs jointly form an output, as shown in FIG. 12C, obtained by having the rear edge of the pulse of FIG. 12A extended up to the point of the synchronizing pulse of FIG. 12B. This is intended to prevent the unstable timing of the rear edge of the output pulse of FIG. 12A due to the irregular position of the scanning slits 39. Namely, the synchronizing pulse of FIG. 12B attains the proper timing of said rear edge. If necessary, the wave shaping circuit 45 may be provided with a preamplifier. Light from the second light projector 10 is supplied to a second detector 5a of the same arrangement as the first one 4a. An output from the second detector 5a is sent to a second wave shaping circuit 46. Now let it be assumed that an output pulse from the second detector 5a presents, as shown in FIG. 13A, a smaller width than that of FIG. 12A. Then an output having the wave form shaped by the synchronizing pulse of FIG. 13B becomes such an output as is narrower than the pulse of FIG. 12C and has the rear edge synchronized with that of the pulse of FIG. 12C.

Figure 14A:
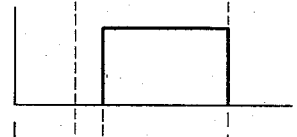

Outputs from the first and second wave shaping circuits 45 and 46 are transmitted to a first and second AND gate respectively together with clock pulses from a clock pulse generator 47. Now let it be assumed that an output from the first wave shaping circuit 45 takes the form of FIG. 14A, an output from the second wave shaping circuit 46 the form of FIG. 14B and a pulse generated by the pulse generator 47 the form of FIG. 14C. Then output clock pulses produced each time from the AND gate 48 and those from the AND gate 49 consist of groups of minor pulses bearing different numbers as shown in FIGS. 14D and 14E, each of said groups of minor pulses having a width corresponding to an output pulse from the first detector 4a and that from the second detector 5a respectively.

Clock pulses of FIGS. 14D and 14E are supplied to a subtracting gate 50 which produces an output representing a difference between the numbers of clock pulses of FIGS. 14D and 14E. The number of output pulses from said subtracting gate 50 expresses the magnitude of the difference d of FIG. 3. The embodiment of FIG. 11 is further provided with a third AND gate 51 so as to generate upon receipt of an output pulse from said subtracting gate 50 a signal instructing the withdrawal from the delivery system of those cut pieces of a steel strip taken out of the shearing machine 6 of FIG. 1 which are found to have the improper rectangularity of the cut sides. A certain length of time is generally taken for those parts of a steel strip 1 whose travelling conditions have been detected, for example, by the first and second detectors 4 and 5 of FIG. 1 to be delivered from the shearing machine 6 after being cut thereby. If some portions of the steel strip 1 are previously determined by the detectors 4 and 5 that they have travelled on the delivery system with the central axis or the lengthwise edge displaced from the central axis of the delivery system, probably resulting in the improper rectangularity of the cut sides, then rejection of such disqualified cut pieces should be effected exactly at the moment they have passed through the shearing machine 6. Otherwise, well-qualified cut pieces of a steel strip would perchance be rejected together with off-grade pieces. To avoid such erroneous rejection, therefore, the embodiment of FIG. 11 is provided with a counter 52 for counting pulses generated by a pulse generator with the rotation of the shearing machine 6. When the cutter blade of the shearing machine 6 is brought exactly to a cutting position after making one rotation, said counter 52 supplies a carry signal to the AND gate 51. Namely, when some portions of a steel strip 1 which have been detected to be disqualified are conducted to an entrance to the shearing machine 6 ready to be cut thereby, the AND gate 51 is opened to produce an output, which is supplied to another AND gate 54 together with an output from an upper-lower limit level setter 53. This level setter 53 is intended to detect whether a number of minor pulses representing the difference between the numbers of output minor pulses from the first and second detectors 4a and 5a falls within a prescribed limit. If the difference exceeds the limit, said AND gate 54 supplies an alarm signal to an upper-lower limit alarm unit 55. An output from the AND gate 51 is conducted to a display unit 56 to indicate the travelling condition of the steel strip 1 and further to a rejection output unit 57 for its actuation, thereby unfailingly effecting the proper rejection of disqualified cut pieces of the steel strip 1 from the delivery system.

Exact coincidence between the portions of a steel strip 1 whose travelling conditions have previously been detected by the detectors and the cut pieces of said strip just after leaving the shearing machine, whether rejected or approved, can be confirmed by other means than the aforesaid process of actuating a pulse generator with the rotation of the cutter of the shearing machine 6, for example, from a signal denoting the running speed of the delivery system and the prescribed length to which the steel strip 1 is to be cut up by the shearing machine. If, in the latter case, the running speed of the delivery system changes, the above-mentioned coincidence can be established all the same.

As mentioned above, the minute determining capacity of the embodiment of FIG. 10 depends on the frequency of clock pulses and the number of rotations of the scanning drum, so that said embodiment can effect a far more minute determination of the displacement of the central axis or the lengthwise edge of a travelling steel strip from the central axis of the delivery system, for example, to an extent of 10 microns than when the light receiver consists of optical fibers. Where the scanning drum 37 rotated at the rate of 2,000 r.p.m., and was perforated with four slits 39 each having a width of 50 microns and clock pulses had a frequency of 200 KHz, then the detector of this invention attained as minute determination as ±5 microns.

What we claim is:

1. An apparatus for detecting the parallelism between the lengthwise edge of an opaque band-shaped material travelling on a delivery system and the longitudinal axis of said delivery system which is set at a right angle to the cutting blade of a shearing machine to which the band-shaped material is to be delivered, comprising a first and a second detector spatially arranged along said lengthwise edge, in the direction of which it travels on the delivery system so as to detect the position of said edge, each detector comprising a first lens for focusing light from a light projector, a view mask bored with an opening in that section where light is focused by said first lens, a second lens for further focusing the light image already obtained in the view mask, a photoelectric conversion element disposed in a position where light is focused by the second lens, a scanning drum located between the view mask and the second lens and perforated with at least one scanning slit and a synchronizing pulse generator associated with said scanning drum; and the means for generating a signal indicating the parallelism of the band-shaped material comprises means for shaping the wave form of outputs from the first and second detectors, a clock pulse generator, a first and a second AND gate supplied with outputs from the wave shaping means and clock pulse generator, a subtracting gate designed to produce a signal representing the difference between the numbers of output pulses from the first and second AND gates, a counter for counting a number of pulses generated with the rotation of the cutter of the shearing machine, an AND gate supplied with carry signals from the counter and outputs from the subtracting gate, and a display unit, an upper-lower limit alarm unit and a rejection output unit, the three last-mentioned members being supplied with outputs from the last-mentioned AND gate.

* * * * *

UNITED STATES PATENT OFFICE
CERTIFICATE OF CORRECTION

PATENT NO. : 3,866,053
DATED : February 11, 1975
INVENTOR(S) : Tokumatsu EMURA et al It is certified that error appears in the above-identified patent and that said Letters Patent are hereby corrected as shown below:

Add priority data as follows:

--[30] Foreign Application Priority Data

April 6, 1972   Japan.............34671/72--.

Signed and Sealed this fifth Day of August 1975

[SEAL]

Attest:

RUTH C. MASON
Attesting Officer

C. MARSHALL DANN
Commissioner of Patents and Trademarks